United States Patent [19]

Lindenberg

[11] 4,157,415
[45] Jun. 5, 1979

[54] LAMINATED PANEL CONSTRUCTION AND METHOD OF MAKING SAME

[76] Inventor: Hügo Lindenberg, Haus Hebborn, 5060 Bergisch Gladbach 2, Fed. Rep. of Germany

[21] Appl. No.: 849,272

[22] Filed: Nov. 7, 1977

[30] Foreign Application Priority Data

Nov. 5, 1976 [DE] Fed. Rep. of Germany ....... 2650628
Nov. 5, 1976 [DE] Fed. Rep. of Germany ... 7635014[U]

[51] Int. Cl.² ............................................. B32B 7/00
[52] U.S. Cl. .................................... 428/284; 156/245; 156/312; 156/324; 428/156; 428/158; 428/170; 428/286; 428/310
[58] Field of Search ............... 428/280, 281, 282, 283, 428/284, 286, 287, 246, 156, 158, 161, 165, 170, 171, 310, 315, 326; 156/245, 278, 280, 312, 324

[56] References Cited

U.S. PATENT DOCUMENTS

| 2,769,742 | 11/1956 | Helbing | 428/246 |
|---|---|---|---|
| 2,955,974 | 10/1960 | Allen et al. | 156/309 |
| 3,775,208 | 11/1973 | Grigoleit | 428/286 |
| 3,909,144 | 9/1975 | Garn et al. | 428/291 |
| 3,992,842 | 11/1976 | Haage et al. | 428/282 |
| 4,044,188 | 8/1977 | Segal | 428/284 |
| 4,090,007 | 5/1978 | Crowley | 428/170 |

*Primary Examiner*—James J. Bell
*Attorney, Agent, or Firm*—John C. Smith, Jr.

[57] ABSTRACT

A laminated panel construction comprises a base panel preferably comprising a propylene polymer and a filler, a non-woven fabric mechanically anchored to a surface of the base panel and a thermoplastic foil secured to the non-woven fabric by an adhesive material. The non-woven fabric is secured to the surface of the base panel by pressing the base panel and non-woven fabric together at elevated heat and pressure. The base panel with the non-woven fabric secured thereto may be shaped into a predetermined configuration before the thermoplastic foil is adhesively bonded to the non-woven fabric.

14 Claims, 4 Drawing Figures

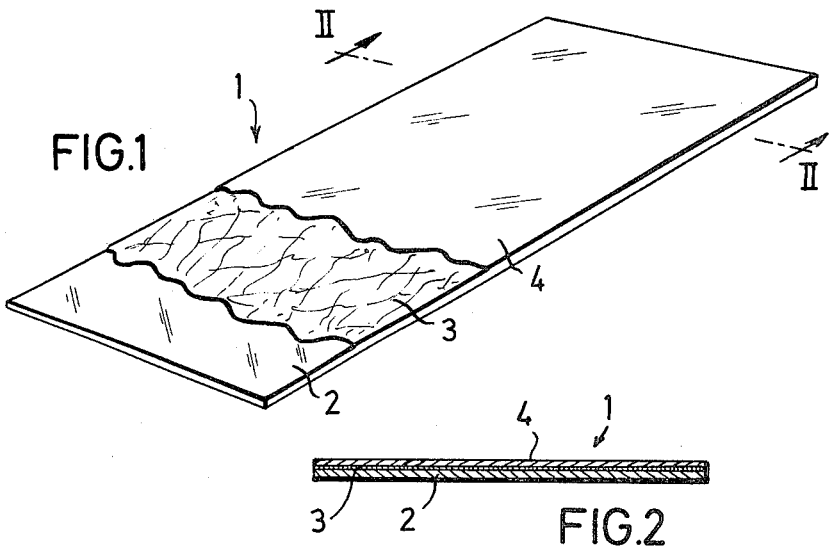
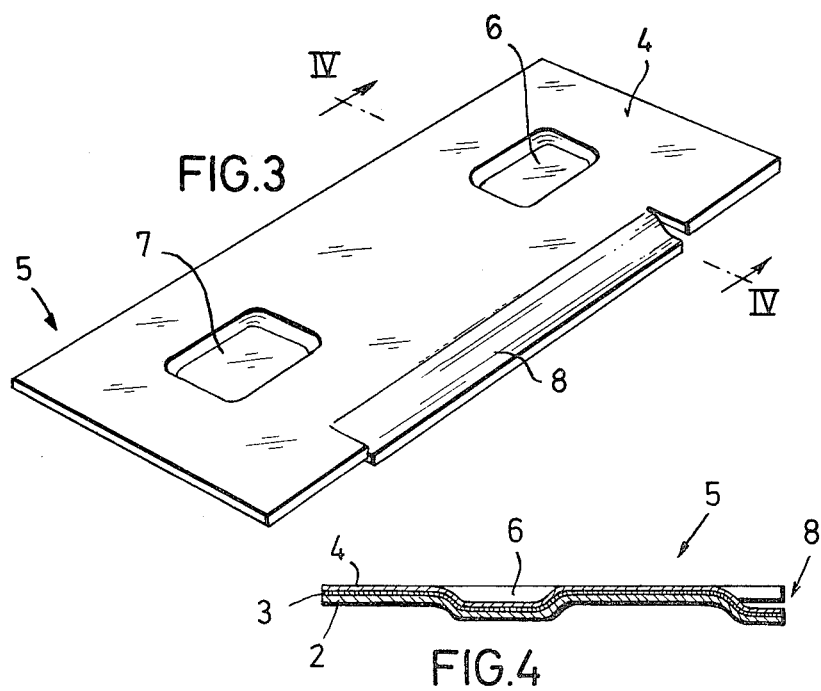

LAMINATED PANEL CONSTRUCTION AND METHOD OF MAKING SAME

This invention relates to an improved laminated panel construction which may be molded to a predetermined configuration depending upon its intended use.

Molded panels comprising a mixture of a thermoplastic material and a filler are used in a variety of applications especially as covering panels. The panels are manufactured as molded components of irregular shape including more or less pronounced bulges on one or the other side therof. Frequently such panels serve as base panels with a cladding as, for example, a plastic foil applied to at least one surface thereof. Usually, a filler or inlay of soft foam material is interposed between the base panel and the plastic foil. The plastic foil may be multilayered.

Such panel constructions are subjected to considerable mechanical stress and consequently must have a high tensile strength. During production of molded components when the planar panels are deformed to a predetermined configuration they must maintain substantially uniform cross-sectional dimensions. The panels must be so constructed as to resist cracking or wrinkling and must be capable of retaining their predetermined size and shape.

The prior art molded panel constructions have not been entirely satisfactory as the panel constructions do not meet all of the above mentioned requirements. In some instances the molded panels have not been dimensionally stable and consequently the molded panel constructions are undesirably reduced in size during further production operations. Some prior art panels have consisted of wood fibers, fiber reinforced textile material and the like which are relatively expensive and not sufficiently deformable for many molding operations. Also, the method of production is expensive and complicated. There are also prior art panels consisting of a polyamide of ethylene and a filling material, particularly finely divided wood such as wood dust or wood fibers. Usually, the proportions of plastic material and filler are about 50—50, though these proportions may vary. While such panels are more easily molded and have better strength, their mechanical properties are not adequate for many uses.

Improved panels were developed in which the plastic material was based on a polymer of propylene. These panels have improved mechanical properties compared with panels containing an ethylene polymer. The inherent stability of the panels is increased. Also, molded panels containing propylene or polypropylene (homopolymers and copolymers) have improved shape retaining ability. However, it has been found that when propylene and polypropylene containing panels are used as base panels in a laminate construction it has in many cases not been possible to secure a plastic foil or the like to the surface of the base panel. The surfaces of propylene and polypropylene containing base panels do not permit sufficient adhesion for an adhesive material used to bond plastic foils to the base panels. Consequently, only a minimal amount of force is required to remove the plastic foil from the base panel. Furthermore, the plastic foil frequently loosens from the base panel under adverse atmospheric conditions, as for example heat and dampness. The adhesive bond between the plastic foil and the base panel is not permanent.

An object of the present invention is to provide an improved laminated panel construction in which the plastic foil cladding on the thermoplastic base panel is permanently bonded thereto.

A further object of the invention is to provide a laminated panel construction including a propylene containing base panel, and particularly a polypropylene base panel, with a thermoplastic foil permanently bonded in place.

A still further object of the invention is to provide a laminated panel construction including a thermoplastic polymer containing base panel, an intermediate resilient layer permanently bonded to a surface of the base panel and a plastic foil cladding permanently bonded to the intermediate layer.

The foregoing and other objects and advantages of the invention will be more fully explained with reference to the accompanying drawings in which:

FIG. 1 is a perspective view of a laminated panel construction according to the invention;

FIG. 2 is a cross-sectional view of the panel taken along the line II—II of FIG. 1;

FIG. 3 is a perspective view of another embodiment of a laminated panel construction; and FIG. 4 is a cross-sectional view of the panel taken along the line IV—IV in FIG. 3.

The laminated panel construction 1 includes a base panel 2 which comprises a mixture of a filler and a thermoplastic material, preferably, a propylene polymer. A non-woven fabric 3 is anchored to the base panel by pressing the non-woven fabric and base panel together at an elevated temperature sufficient to soften the thermoplastic polymer of the base panel. A thermoplastic foil or the like 4 which usually serves as a decorative covering is bonded to the surface of the non-woven fabric 3 by means of an adhesive substance.

Referring to the embodiment illustrated in FIGS. 3 and 4, the laminated panel construction 5 has been molded to a predetermined configuration but otherwise corresponds to the construction illustrated in FIGS. 1 and 2. The panel includes embossed portions or bulges 6 and 7 and a bevel 8 extending along one edge of the panel. It should be understood that the laminated panel construction of the present invention can be molded or otherwise formed into any desired configuration.

The composition of the base panel comprises a mixture of a filler material and a thermoplastic polymer. The polymer is desirably a propylene containing polymer and preferably polypropylene, although copolymers of polypropylene are also suitable. The filler material is preferably a finely divided wood in the form of dust chip fibers and the like, although other known filler materials may be used such as other cellulose containing materials and mineral fibers which are not adversely affected by elevated temperatures.

The non-woven fabric is preferably a resilient material such as an expansive fleece composed of synthetic or natural fibrous material. Examples of fleece materials include synthetic wool and/or natural wool. The non-woven fabric layer is relatively thin and generally has a density of about 20–40 g/qm.

The non-woven fabric is mechanically anchored to the surface of the base panel. The base panel and non-woven fabric are heated to a temperature of about 150° to 250° C. and pressed together under relatively high pressure causing the surface fibers of the non-woven fabric to be at least partially embedded in the softened surface of the thermoplastic base panel, mechanically anchoring the non-woven fabric on the surface of the base panel. No adhesive is required to secure the fabric on the base panel.

The thermoplastic foil is preferably a tension-proof plastic foil or a shaped plastic sheet which preferably consists of polyvinyl chloride, though other thermoplastic materials may be used. The thermoplastic foil is secured to the surface of the non-woven fabric by any appropriate adhesive material.

The laminated panel construction of the present invention may have an overall thickness ranging between about 1 mm and 15 mm.

In the production of a molded component such as is illustrated in FIGS. 3 and 4, preferably, the non-woven fabric and base panel are first secured together in the manner described above after which the combination of the base panel and non-woven fabric layer are molded by conventional means to form the predetermined configuration. The thermoplastic foil is then adhesively secured to the previously shaped surface of the non-woven fabric.

Optionally, individual elements such as hooks or the like may be secured to the base panel of the laminated panel construction. Thus, the plastic foil cladding may be applied to the non-woven fabric on one side of the base panel and the hooks affixed to the opposite side of the base panel. Reinforcement elements may also be bonded or otherwise secured to the side of the base panel opposite the plastic foil cladding.

It will be appreciated that though the described laminated panel construction was developed primarily for use where the base panel contains a polymer of propylene, since other materials such as the thermoplastic foil cannot be permanently bonded to the surface of the propylene polymer containing base panel, this invention is suitable for use in the construction of laminated panels wherein the base panel contains other thermoplastic polymers such as polyethylene.

The laminated panel construction of the present invention is ideally suited for use in the interior of motor vehicles where such panels are molded into predetermined configurations, as the interior walls of rooms, in furniture manufacture, in packaging, in electrical engineering, in machine construction, etc.

This improved laminated panel construction offers substantially improved properties and advantages. The panels may be molded easily during mass production without the formation of cracks or wrinkles. The panels have ideal mechanical properties, particularly with respect to strength and stability in shape. The plastic foil which is frequently decorative may be securely bonded in place, even in those instances where the internal surface of the plastic foil is smooth. The adhesive bond is reliable, extremely firm and permanent, this being attributable to the interposed non-woven fabric which is in turn bonded without adhesive material to the surface of the base panel. The mechanical bonding of the non-woven fabric to the base panel and the plastic foil cladding adhesively secured to the non-woven fabric result in an ideally finished product. The improved laminated panel is particularly suited in motor vehicle construction since the panel can be easily molded to the required predetermined configuration.

This invention is not to be limited to the exact form shown in the drawings for obviously many changes may be made, some of which are suggested herein.

I claim:

1. A molded laminated panel construction comprising:

(a) a base panel of predetermined stable configuration and comprising a thermoplastic propylene-containing polymer and a filler, said filler comprising a cellulose-containing material,
   (b) a non-woven expansible fabric mechanically anchored to and extending as a continuous unbroken layer over a surface of said base panel, said fabric being selected from the group consisting of synthetic and natural fibers,
   (c) a thermoplastic foil having a surface thereof secured to said non-woven fabric by an adhesive material such that said foil surface and non-woven fabric are maintained coextensive.

2. A laminated panel construction as defined in claim 1 wherein said propylene containing polymer is polypropylene.

3. A laminated panel construction as defined in claim 1 wherein said non-woven fabric is an expansible fleece selected from the group consisting of synthetic wool and natural wool.

4. A laminated panel construction as defined in claim 3 wherein the density of said non-woven fabric is about 20–40 g/qm.

5. A laminated panel construction as defined in claim 1 wherein said thermoplastic foil is selected from the group consisting of a tension-proof plastic foil and a foam plastic foil suitable for deep drawing.

6. A laminated panel construction as defined in claim 1 wherein said filler cellulose-containing material is finely divided wood.

7. A laminated panel construction as defined in claim 1 wherein said thermoplastic foil comprises polyvinyl chloride.

8. A method of producing a molded laminated panel construction comprising the steps in sequence of:

(a) compressing a non-woven expansible fabric, selected from the group consisting of synthetic and natural fibers, onto a surface of a base panel, comprising a thermoplastic propylene-containing polymer, and a filler, comprising a cellulose-containing material, under high pressure while said base panel and fabric are maintained at a temperature of about 150° C. to 250° C. to mechanically anchor said non-woven fabric to said surface of said base panel,
   (b) molding said base panel with said non-woven fabric secured to the surface thereof into a predetermined stable configuration with said non-woven fabric extending as a continuous unbroken layer over said base panel surface, and then securing a surface of a thermoplastic foil to said non-woven fabric by means of an adhesive material such that said foil surface and non-woven fabric are maintained coextensive.

9. A method as defined in claim 8 wherein said propylene containing polymer is polypropylene.

10. A method as defined in claim 8 wherein said non-woven fabric is an expansible fleece selected from the group consisting of synthetic wool and natural wool.

11. A method as defined in claim 8 wherein the density of said non-woven fabric is about 20–40 g/qm.

12. A method as defined in claim 8 wherein said thermoplastic foil is selected from the group consisting of a tension-proof plastic foil and a foam plastic foil suitable for deep drawing.

13. A method as defined in claim 8 wherein said cellulose-containing material is finely divided wood.

14. A method as defined in claim 8 wherein said thermoplastic foil comprises polyvinyl chloride.

* * * * *

UNITED STATES PATENT OFFICE
CERTIFICATE OF CORRECTION

Patent No. 4,157,415          Dated June 5, 1979

Inventor(s) Hugo Lindenberg

It is certified that error appears in the above-identified patent and that said Letters Patent are hereby corrected as shown below:

The inventor's name on the cover page should read as follows:

-- Hugo Lindenberg --

Signed and Sealed this

Eighteenth Day of September 1979

[SEAL]

Attest:

Attesting Officer

LUTRELLE F. PARKER
Acting Commissioner of Patents and Trademarks